United States Patent Office 2,698,464
Patented Jan. 4, 1955

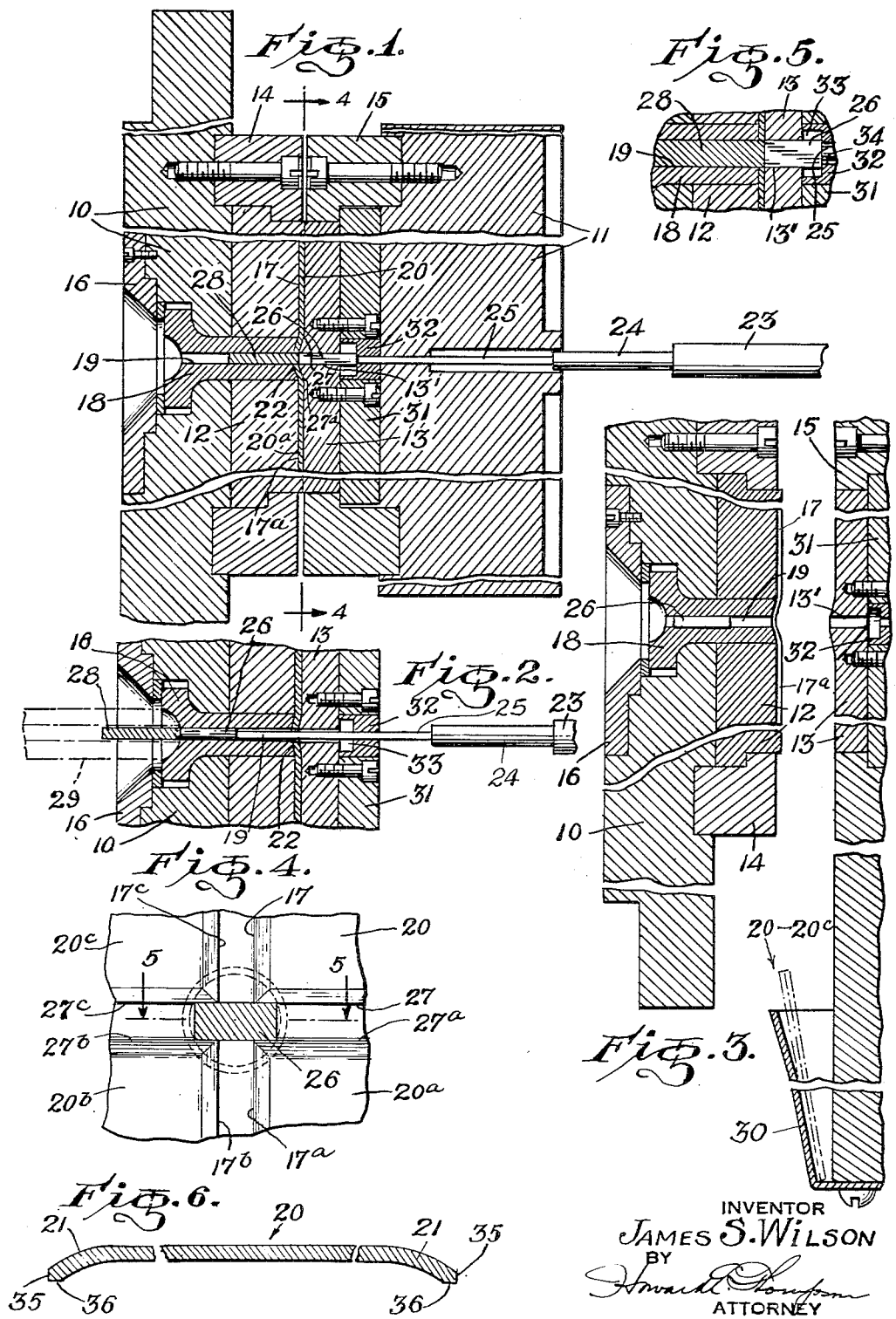

2,698,464

METHOD OF FORMING GATE-FREE INJECTION MOLDED PRODUCTS

James S. Wilson, Short Hills, N. J., assignor to M and W Company, Inc., Rahway, N. J., a corporation of New Jersey Application July 10, 1952, Serial No. 298,071

7 Claims. (Cl. 18—55)

This invention relates to the formation of a plurality of injection moulded products, such for example as plastic tile in cavities of a pair of relatively movable dies. More particularly, the invention deals in a method of joining cavities of the dies in a single gate at adjacent edge and/or corner portions of the respective products to be formed and then in utilizing a gate removing member or element to trim the gate from all of the products and to return the gate, sometimes referred to as a sprue, to the heated zone for remelting. By this method, completely finished and trimmed products can be removed from cavities of the dies for packaging and shipment without additional handling and operations to care for trimming.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a diagrammatic broken sectional view through a pair of dies indicating portions of the cavities of the dies and showing the parts in the position of forming castings in said cavities.

Fig. 2 is a view similar to Fig. 1 showing only part of the construction and illustrating the removal of the gate or sprue.

Fig. 3 is a view similar to Fig. 1 showing the dies in open position and indicating a receiver into which the moulded products are delivered, preparatory for passage to a packaging and shipping station.

Fig. 4 is an enlarged section substantially on the line 4—4 of Fig. 1 showing adjacent corner portions of four moulded products.

Fig. 5 is a partial section on the line 5—5 of Fig. 4; and

Fig. 6 is an enlarged sectional detail of one tile made according to my invention.

In Fig. 1 of the drawing, I have indicated at 10 and 11 suitable supports for a pair of dies 12 and 13. The support 10 and die 12 may be relatively fixed, whereas, the support 11 and die 13 is movable toward and from 10 and 12 in removal of the moulded products from the die cavities, as will appear from a consideration of Fig. 3 of the drawing. Suitable clamps 14 and 15 are employed to detachably couple the dies with the supports 10 and 11.

Mounted on the support 10 I have illustrated a conical ring 16 at the end of a heated cylinder, not shown, from which heated plastic material can be pressure injected into the die cavities 17, 17a, 17b and 17c, note Fig. 4, through a combination nozzle and bushing 18 or the gate or sprue bore 19 thereof. The cavities 17, 17a, 17b and 17c, in the construction shown, are so fashioned, as to produce four plastic tiles 20, 20a, 20b and 20c, parts of which are illustrated in Fig. 4 of the drawing and, in Fig. 6, an enlarged section through the tile 20 is shown to illustrate that peripheral edges of the tile are slightly bevelled, as seen at 21. In this connection, it will be noted that the inner end of the bushing is fashioned as at 22 to partially form this bevel.

At 23 I have shown, in Fig. 1, a plunger having reduced portions 24 and 25 which operate in the die support 11. At 26 is shown a gate or sprue stripping and feed pin actuated by plunger 23—25 in one direction and the pressure injected material in the other direction. The pin 26 is of the rectangular cross-sectional form, clearly noted in Fig. 4 of the drawing, in other words, overlaps adjacent edges 27, 27a, 27b and 27c of the titles 20, 20a, 20b and 20c, respectively. The bore 19 is of the same cross-sectional form as the pin 26 with slight clearance to facilitate free movement of the pin in said bore.

In Fig. 1 of the drawing, the pin 26 is shown supported in the bore 13' of the die 13, blocking the end of the bore 19 at the surface of the die 13 in the injection charge of the plastic material into the cavities of the dies to form the respective tile 20—20c. Upon completing this operation, the plunger 23 is actuated by suitable means, not shown, to advance the pin 26 substantially in the manner indicated in Fig. 2, to return the sprue or gate 28 to position within the nozzle, which is indicated in part in dot and dash lines at 29 in Fig. 2, which nozzle represents the heated zone and, thus, the sprue is remelted as will be apparent.

Upon completing the above operation, the plunger 23 is moved in the opposite direction to return the same to the position shown in Fig. 1, leaving the pin 26 in the bushing 18, after which the dies are separated in the manner illustrated clearly in Fig. 3 of the drawing and the four tiles are suitably displaced from the dies and drop into a receiving trough or shute 30, from which they can be conveyed to a delivery or packaging station, that is to say, from the trough, the tile can move onto a conveyor in manners well known for conveyance to such a station.

It will be noted from a consideration of Figs. 1, 2 and 5 of the drawing that the packing 31 for the die 13 includes a bushing 32, in which the reduced portion 25 of the plunger 23 operates and this bushing is recessed, as seen at 33, to receive the inner end of the pin 26, the wall 34 of the recess 33, forming a stop, checking and positioning the pin 26, as shown in Fig. 1.

After the tile has been removed from the dies, the dies are again closed in a manner shown in Fig. 1 and, in the operation of pressure injecting plastic material into the die cavities, the pin 26 is advanced by the plastic material to its stopped position in the manner clearly illustrated.

It will appear from a consideration of Figs. 1 and 4 of the drawing that, in the sprue trimming operation, a relatively thin wall section of solidified plastics is trimmed, by the pin 26, at the edges 27—27c which are overlapped by the pin 26 and, thus, the entire sprue is returned to the heated zone leaving the four tile 20—20c completely trimmed so that finished products are delivered from the machine, ready for immediate packaging and shipment. It will be noted, from a consideration of Fig. 6 of the drawing, that the bevelled edges 21 of the tile terminate in straight peripheral edges 35, which is the sheared edge partially formed by the pin 26 at the adjacent corners noted in Fig. 4 and this edge meets a short flat 36, at what would be the inner surface of the tile, thus producing, between the edges 35, 36 right angle corners which facilitate the placement of the tile on supports producing perfect abutments between adjacent tiles, as well as strength at peripheral edges of the tiles.

The present invention deals with the general type of machines as disclosed in the application of Abraham I. Massler, Serial Number 78,065, filed February 24, 1949, in which application a hole is pierced in the center of a record disc in trimming the gate or sprue from the moulded product and in returning the gate or sprue to the heated zone. The above application having issued in Patent No. 2,613,395, granted October 14, 1952. In my present conception, it will be apparent that the sprue constitutes a complete sprue structure and, while in the moulding operation, it is integral with or constitutes a part of the respective moulded products and solidified by virtue of the chilled moulds or dies which are employed. It is the shearing of the solidified sprue from the product parts which results in producing completely finished moulded products which are ready for packaging and shipment.

From the standpoint of description, the pin 26 may be regarded as a sprue shearing element utilized after completing its shearing operation to deliver the solidified sprue back to the heated zone for remelting. It will also be apparent that, while I have given as an illustration in the present disclosure the formation of a plurality of plastic tile, it is by way of illustration, and other products can be formed and trimmed in the manner defined, it being understood that, at all times, the cross-sectional shape of the sprue trimming element will be the same as the cross-sectional form of the sprue, particularly at the point of shearing the sprue from the several products.

Having fully described my invention, what I claim as new and desire to secure by Letters Patent is:

1. The herein described method of forming and trimming moulded products of the character described, which comprises pressure injecting moulding material from a heated zone into spaced cavities of a pair of relatively movable dies through a sprue bore opening into all of said cavities at adjacent edge portions of the cavities, positioning a sprue removal element of common cross-sectional contour to the cross-sectional contour of said sprue bore in axial alinement with the bore and in position to partially form said sprue, then actuating said element to trim the sprue from the adjacent edge portions of products formed in said cavity and to feed the element into the sprue bore, then returning the sprue to the heated zone for remelting, then separating the dies in removal of the moulded products therefrom, then closing the dies, and moving the element from the last position in the sprue bore to its normal moulding position in the operation of pressure injecting the moulding material into the sprue bore and die cavities.

2. The method of forming a plurality of trimmed injection moulded products, which comprises pressure injecting thermoplastic moulding material from a heated zone through a sprue bore into a plurality of alined cavities of a pair of dies to form, in said cavities, a plurality of moulded products, including a solidified sprue integrally joining adjacent edges of said products, the sprue bore being of predetermined cross-sectional form where it joins the products and throughout the length thereof, positioning a freely movable sprue removal element in axial alinement with said bore, said element being of the cross-sectional form of said sprue and bore, then actuating said element to trim the sprue simultaneously from adjacent edge portions of all of the products and to return the sprue to the heated zone for re-melting with said element positioned adjacent the heated zone, then separating the dies and discharging the trimmed finished products from the dies into a suitable receptacle, then closing the dies, and again pressure injecting moulding material into the sprue bore and feeding said element through the sprue bore by said injected material to a position exposing the cavities of the dies for injection of the moulding material into said cavities.

3. The method of forming a plurality of injection moulded products, which comprises pressure injecting thermoplastic moulding material from a heated zone through a sprue bore into a plurality of alined cavities of a pair of relatively movable dies with the dies held in firm engagement with each other, forming, in said cavities and sprue bore, solidified products and a sprue integrally joining adjacent spaced edges of the products, the sprue bore, throughout its length, being of one cross-sectional form and extending to said adjacent edge portions of the products, partially forming the sprue by a sprue removal element supported in one of the dies in axial alinement with said sprue bore, actuating said element to strip the sprue from said products and deliver the sprue to said heated zone and said element to the other of the dies and adjacent said heated zone, then separating the dies and removing the moulded products therefrom, while leaving said element in the last named die, then closing the dies and again pressure injecting thermoplastic material into the die cavities and feeding said element through the sprue by said injected material to predetermined stop position in the first named die in said last named operation.

4. The method of forming a plurality of injection moulded products, which comprises pressure injecting thermoplastic moulding material from a heated zone through a sprue bore into a plurality of alined cavities of a pair of relatively movable dies with the dies held in firm engagement with each other, forming, in said cavities and sprue bore, solidified products and a sprue integrally joining adjacent spaced edges of the products, the sprue bore, throughout its length, being of one cross-sectional form and extending to said adjacent edge portions of the products, partially forming the sprue by a sprue removal element supported in one of the dies in axial alinement with said sprue bore, actuating said element to strip the sprue from said products and deliver the sprue to said heated zone and said element to the other of the dies and adjacent said heated zone, then separating the dies and removing the moulded products therefrom, while leaving said element in the last named die, then closing the dies and again pressure injecting thermoplastic material into the die cavities and feeding said element through the sprue by said injected material to predetermined stop position in the first named die in said last named operation, and passing the moulded products, in removal from the dies, to a delivery trough in feed discharge of the products from the dies.

5. The herein described method of producing a plurality of moulded products in a pair of relatively movable dies, wherein the products have adjacent spaced edge portions at a predetermined position within the dies, pressure injecting moulding material into the cavities of the dies in forming said products through a sprue bore opening into the die cavities at and in alinement with said adjacent edge portions of the products, forming a sprue integrally joining the products at said edge portions, arranging a sprue trimming element in axial alinement with said sprue bore and having surfaces in alinement with said edges of the products, actuating said element to trim the sprue simultaneously from all of the moulded products at said adjacent edges and feed said sprue through said sprue bore to the source of supply of moulding material, leaving said element at a position beyond the die cavities and trimmed products, then separating the dies and removing the trimmed moulded products therefrom, closing said dies and again pressure injecting moulding material through the sprue bore, and advancing the element by said injected material through the sprue bore to a position exposing the cavities for reception of said moulding material.

6. In the formation of a plurality of injection moulded products in spaced cavities of a pair of relatively movable dies by pressure injection of moulding material into the die cavities, the method which comprises joining the spaced products formed in said cavities in a single sprue of common cross-sectional form throughout its length and integrally joining the products at adjacent edge portions thereof, trimming the sprue from the products by a sprue removal element of a cross-sectional contour common to the cross-sectional contour of the sprue and with edge portions in alinement with edge portions of the products in producing, within the dies, trimmed products, positioning said element beyond the die cavities and trimmed products to free the cavities for removal of the trimmed products from the dies, then opening the dies and removing the trimmed products therefrom, again closing the dies, and then moving said element by the injected moulding material to a position exposing said cavities for reception of said injected material in forming another series of products.

7. The herein described method of producing plastic tile, which comprises utilizing a pair of dies having four mould cavities, each of the contour of a tile to be formed, positioning the cavities in the dies to dispose four corner edge portions of the four tiles in closely spaced relationship to each other, providing in one of the dies a sprue bore opening into all of the cavities at at least one edge of the corner edge portion of each of the four tiles to be formed in said cavities, arranging a sprue removal element in the other die of a cross-sectional form common to that of said sprue and having surfaces in alinement with said edges of the tiles joined with said sprue, pressure injecting thermoplastic material into said cavities through said sprue bore to form four tiles united by a single sprue, actuating said element to sever the sprue simultaneously from all of the tiles at said edges in producing finished trimmed tiles, moving said element into a position clearing the cavities and trimmed tiles, then opening the dies and removing the trimmed tiles therefrom, again closing the dies, and then returning said element to the first named position in the second named die by the injected moulding material for producing the next series of tiles.

References Cited in the file of this patent

UNITED STATES PATENTS

| Number | Name | Date |
|---|---|---|
| 2,330,369 | Marsh | Sept. 28, 1943 |
| 2,613,395 | Massler | Oct. 14, 1952 |